UNITED STATES PATENT OFFICE.

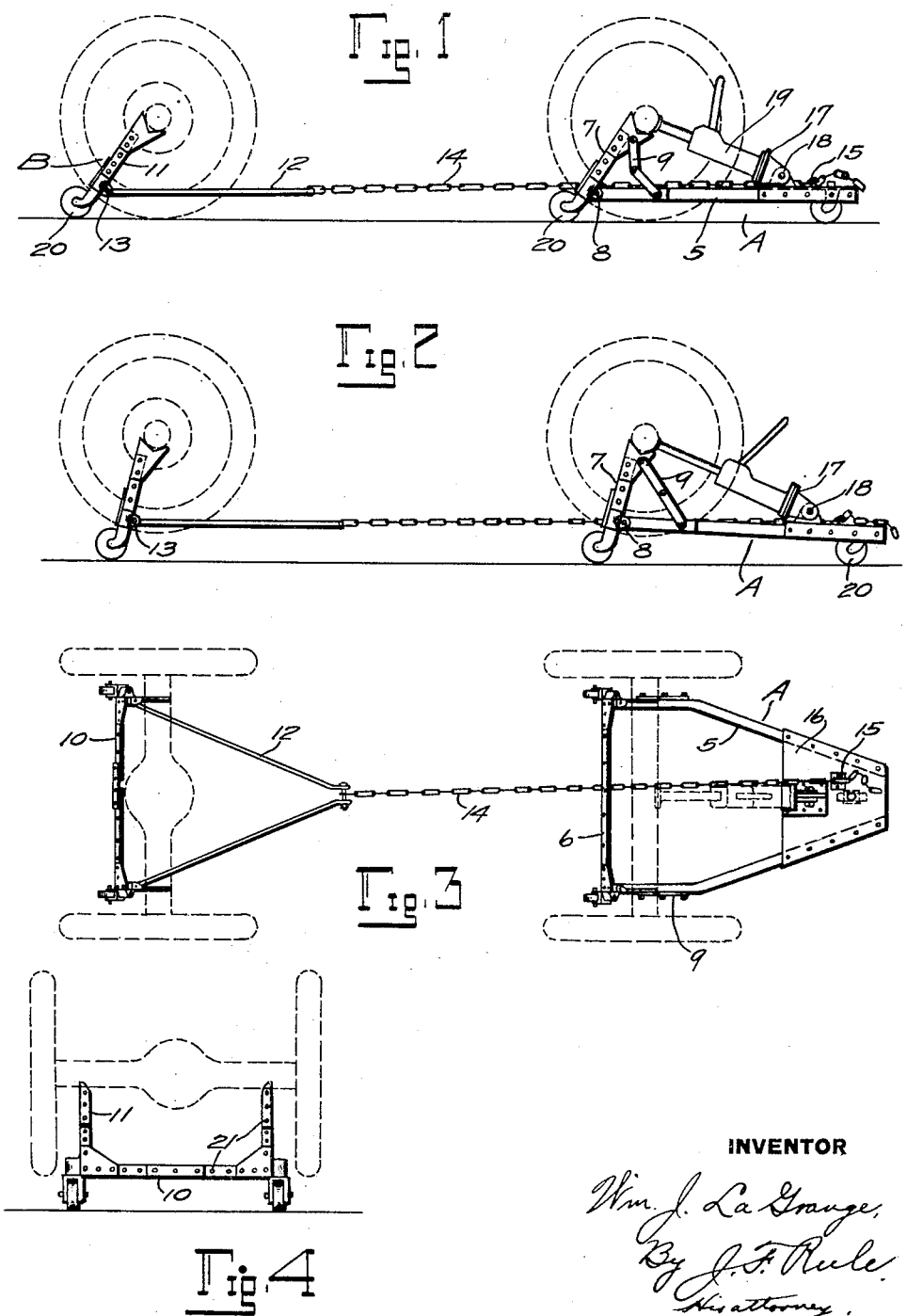

WILLIAM J. LA GRANGE, OF RENSSELAER, NEW YORK.

AUTOMOBILE TURNTABLE-JACK.

1,336,037.　　　　　　　Specification of Letters Patent.　　　Patented Apr. 6, 1920.

Application filed March 19, 1919.　Serial No. 283,626.

*To all whom it may concern:*

Be it known that I, WILLIAM J. LA GRANGE, a citizen of the United States, and resident of Rensselaer, in the county of Rensselaer and State of New York, have invented certain new and useful Automobile Turntable-Jacks, of which the following is a specification.

My invention relates to an apparatus particularly adapted for lifting and supporting automobiles, and may be termed an automobile turn table jack. An object of the invention is to provide a simple, practical and inexpensive device consisting of a combined lifting jack and truck adapted to lift the entire automobile at once, and support it on casters, permitting it to be readily turned or shifted to any desired position while thus supported.

Other objects of the invention will appear hereinafter.

Referring to the accompanying drawings which illustrate a construction embodying the principles of my invention,—

Figure 1 is an elevation of the device placed in position under the automobile ready for lifting it. Fig. 2 is a similar view showing the automobile lifted. Fig. 3 is a plan view. Fig. 4 is a rear view.

The apparatus comprises a front truck A and a rear truck or frame B. The front truck includes a horizontally disposed base 5 at the rear end of which is pivoted at 8 a frame comprising a transverse bar 6 and inclined end bars 7. Toggle links 9 may be provided between the base 5 and the bars 7.

The rear frame B comprises a transverse member 10 and inclined bars 11. Forwardly converging horizontal rods 12 are connected at their rear ends by pivots 13 to the frame B. A connecting rod or chain 14 is attached to the rods 12 and extends forwardly therefrom to the front truck, to which it is attached by a hook 15 mounted on a plate 16 forming part of the base 5. A foot 17 connected to the base plate 15 by a pivot 18 provides an abutment for a lifting jack 19 interposed between said foot and the front axle of the car.

Casters 20 are swiveled in the lower corners of the truck B and the frame 6, 7, and at the front end of the truck A. The legs or bars 7 and 11 are made in sections connected by screw bolts 21 permitting the length of said bars to be readily adjusted. The width of the trucks is also adjustable in like manner, so that the apparatus may be quickly adjusted to any auto. In operation, the apparatus is placed beneath the car with the bars 7 and 11 inclined upwardly and forwardly to engage the front and rear axles of the car. The jack 19 is placed in position and operated in the usual way. The front axle is thus forced rearwardly and causes the bars 7 to swing toward a vertical position, thereby raising the axle and lifting the front of the car. The rearward movement of the front axle forces the entire car to move rearwardly, so that the rear truck B is swung toward a vertical position, thereby lifting the rear end of the car. The entire car is thus lifted at once by the operation of the jack 19, the parts assuming the position shown in Fig. 2. As the car is lifted the toggles 9 are straightened so that they will hold the car independently of the jack 19.

The swiveled casters 20 permit the car to be easily moved or turned in any direction while supported thereon. They also permit the tilting movement of the arms 7 and 11 as the car is lifted, during which movement the casters roll forward relatively to the front truck base 5.

Modifications may be resorted to without departing from the spirit and scope of my invention.

What I claim is:

1. An automobile turn table jack comprising in combination, a front truck base, a forwardly inclined frame pivoted thereto and arranged to engage the front axle of an automobile, a forwardly inclined rear frame to engage the rear axle of the automobile, a lifting jack supported on said truck base and extending upwardly and rearwardly to the front axle, and a connection between said rear frame and said truck base, whereby when the jack is operated to force the front axle rearwardly, said inclined frames are both positively moved toward a vertical position and the automobile lifted.

2. An automobile turn table jack comprising in combination, a front truck base, a forwardly inclined frame pivoted thereto and arranged to engage the front axle of an automobile, a forwardly inclined rear frame to engage the rear axle of the automobile, a lifting jack supported on said truck base and extending upwardly and rearwardly to the front axle, a connection between said rear axle and said truck base, whereby when the jack is operated to force the front axle rearwardly, said inclined frames are swung toward a vertical position and the automobile lifted, and casters swiveled in the inclined frames and supporting the weight of the load during said swinging of the frames.

3. An automobile turn table jack comprising in combination, a front truck base, a forwardly inclined frame pivoted thereto and arranged to engage the front axle of an automobile, a forwardly inclined rear frame to engage the rear axle of the automobile, a lifting jack supported on said truck base and extending upwardly and rearwardly to the front axle, a connection between said rear frame and said truck base, whereby when the jack is operated to force the front axle rearwardly, said inclined frames are swung toward a vertical position and the automobile lifted, and toggle links between said front truck base and its inclined frame, whereby as the latter swings upward the toggle is straightened into position to lock the frame and hold the automobile up independently of said jack.

4. The combination of a truck base, a lifting frame pivoted to the rear end of said base and extending below and above its pivot in a forwardly inclined direction and forked or recessed at its upper end to engage an axle of a vehicle, a foot pivoted to the forward part of the truck base to form a support for a jack extending upwardly and rearwardly therefrom to said axle, whereby when the jack is expanded said axle is forced rearwardly relatively to the truck and said inclined lifting frame swung toward a vertical position, thereby lifting the vehicle.

Signed at Rensselaer, in the county of Rensselaer and State of New York, this 13th day of March, A. D. 1919.

WILLIAM J. LA GRANGE.

Witnesses:
 ALBERT L. MADER,
 HAZEL B. CROOKES.